United States Patent Office 3,151,152
Patented Sept. 29, 1964

3,151,152
PROCESS FOR THE PRODUCTION OF BROMO-FLUORO ACETIC ACID ESTERS
Richard Wessendorf, Erpel, and Hans Machleidt and Michael Klockow, Bonn, Germany, assignors to Olin Mathieson Chemical Corporation, New York, N.Y., a corporation of Virginia
No Drawing. Filed June 5, 1963, Ser. No. 285,590
10 Claims. (Cl. 260—487)

This invention relates to a process for the production of bromofluoro acetic acid esters of the formula (I) 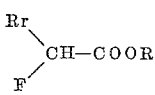

wherein R represents lower alkyl, cycloalkyl, aryl or aralkyl.

The lower alkyl groups represented by R include, for example, methyl, ethyl, propyl, isopropyl and the like, ethyl being preferred. The cycloalkyl groups include the 3 to 6 membered alicyclic groups cyclopropyl, cyclobutyl, cyclopentyl and cyclohexyl. The aryl groups include phenyl and simply substituted phenyl e.g., halophenyl such as chlorophenyl, lower alkylphenyl, such as tolyl, and the like. The aralkyl groups are lower alkyl groups to which are attached phenyl groups of the type mentioned, e.g., benzyl, phenethyl, etc.

It has been found that bromofluoro acetic acid esters of Formula I, which have previously been prepared by multistep methods involving four or six steps and low yields, can now be prepared by a one step process providing good yields. This process comprises reacting a diazoacetic acid ester e.g., of the formula (II)     N≡NCH—COOR with a brominating agent in the presence of hydrogen fluoride in an inert polar solvent at a temperature between about —70° and 0° C.

Bromine donors which are effective include bromosuccinimide, bromoacetamide, and the like, as well as molecular bromine which may be dissolved in the hydrogen fluoride. Bromosuccinimide is preferred since the succinimide which precipitates during the reaction can readily be isolated and regenerated. Solvents for the reaction include ethers, preferably dialkyl ethers, e.g., diethyl ether, tetrahydrofuran, Diglyme and the like. A technical grade of hydrogen fluoride, e.g., about 99% purity, may be used.

The ratio of reactants is not critical and may be varied over a broad range. An excess of hydrogen fluoride over the bromine donor is preferable and about 3 moles HF to about 1 mole of brominating agent gives best results.

The bromofluoro acetic acid esters are known compounds which are useful in the synthesis of various fluorinated compounds, especially fluoroisoprenols. For example, α-bromo-α-fluoro acetic acid ethyl ester reacts with triethylphosphite to produce diethylcarbethoxy fluoromethyl phosphonate which in turn will react with a variety of ketones to produce fluorinated esters which have hypocholesteremic activity inhibiting cholesterol biosynthesis and which are also useful in producing other compounds with biological activity, e.g., fluorinated vitamin A and esters. The phosphonate will react with acetone, for example, to produce ethyl 2-fluoro-3-methyl crotonate and with 6-methyl-5-hepten-2-one to produce ethyl 2-fluoro-3,7-dimethyl-2,6-octadienoate.

The following examples are illustrative of the invention. All temperatures are in centigrade.

Example 1

In a polyethylene reaction vessel, 120 g. (6.0 moles) hydrogen fluoride (99% pure) are mixed with 500 ml. dry diethyl ether and 320 g. (1.8 moles) N-bromosuccinimide at —70° with stirring and external cooling. 230 g. (1.8 moles) ethyl diazoacetate are then added. The reaction is complete after 10 hours at —70° and stirring at room temperature for two hours. The precipitated succinimide is filtered washed with ether and dried.

The filtrate is concentrated by evaporation in vacuo at about 100 mm. Hg and 30° bath temperature. After dropping the concentrate into a stirred mixture of 650 g. (6.5 moles) KHCO$_3$-1.5 l. water, the bromofluoro ester is extracted with ether. After removing the solvent by distillation in vacuo, distillation of the residue yields 195 g. (58% of the theoretical) of a α-bromo-α-fluoro acetic acid ethyl ester, boiling at 68°, 34 mm. Hg $n^{20}$ 1.4275.

Example 2

40 g. (2 moles) of technical, anhydrous hydrofluoric acid are slowly added to 150 ml. of ether in a 250 ml. polyethylene flask with stirring at —70°. Then 16 gms. (5.1 ml., 0.1 mole) of bromine are added.

To this solution are added dropwise over a period of 30 minutes 22 gms. (0.2 mole) of ethyl diazoacetate at —70° with stirring. After an additional hour at —70°, the temperature is gradually brought to room temperature. The reaction mixture is then poured into an ice cold, saturated potassium hydrogen carbonate solution and vigorously agitated for 10 minutes. After separation of the phases the aqueous solution is extracted three times with 100 ml. portions of ether. The ether extracts are combined, agitated with dilute potassium hydrogen carbonate solution and then washed twice with water. After drying over magnesium sulfate, the solvent is distilled in vacuo to obtain the same product as in Example 1.

Example 3

Following the procedure of Example 2 but starting with the cyclopentyl ester yields the corresponding cyclopentyl ester as product.

What is claimed is:

1. A process for the production of a compound of the formula

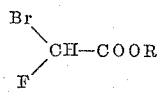

wherein R is a member of the group consisting of lower alkyl, cycloalkyl, aryl and aralkyl, which comprises reacting a compound of the formula

N≡NCH—COOR wherein R is the same as above,
with a brominating agent in the presence of hydrogen fluoride in an inert polar solvent at a temperature of about —70° to 0° C.

2. A process as in claim 1 wherein the brominating agent is N-bromosuccinimide.

3. A process as in claim 1 wherein the brominating agent is N-bromoacetamide.

4. A process as in claim 1 wherein the brominating agent is bromine.

5. A process as in claim 1 wherein the solvent is an ether.

6. A process for the production of a compound of the formula

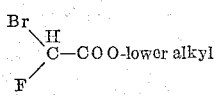

which comprises reacting a compound of the formula $$N \equiv N-CH-COO-\text{lower alkyl}$$

with N-bromosuccinimide in the presence of hydrogen fluoride in an inert polar solvent at a temperature of about −70° to 0° C.

7. A process as in claim 6 wherein the solvent is ether.

8. A process as in claim 7 wherein the ratio of hydrogen fluoride to N-bromosuccinimide is about 3 moles to 1 mole.

9. A process for the production of α-bromo-α-fluoro acetic acid ethyl ester which comprises reacting ethyl diazoacetate with N-bromosuccinimide in the presence of hydrogen fluoride in ether solvent at a temperature of about −70° to 0° C.

10. A process for the production of α-bromo-α-fluoro acetic acid ethyl ester which comprises reacting ethyl diazoacetate with bromine in hydrogen fluoride and ether at a temperature of about −70° to 0° C.

References Cited in the file of this patent

Houben-Weyl, Methoden der Organischen Chemie, pp. 214–221 (1962).